(12) United States Patent
Sasaki

(10) Patent No.: US 9,800,767 B2
(45) Date of Patent: Oct. 24, 2017

(54) IMAGE PICKUP APPARATUS WITH SHOCK RESISTANCE

(71) Applicant: CANON KABUSHIKI KAISHA, Tokyo (JP)

(72) Inventor: Daisuke Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/923,121

(22) Filed: Oct. 26, 2015

(65) Prior Publication Data
US 2016/0119513 A1    Apr. 28, 2016

(30) Foreign Application Priority Data
Oct. 28, 2014  (JP) ................................ 2014-219765

(51) Int. Cl.
*H04N 5/225* (2006.01)
*G03B 17/02* (2006.01)
*G03B 17/56* (2006.01)

(52) U.S. Cl.
CPC .......... *H04N 5/2251* (2013.01); *G03B 17/02* (2013.01); *G03B 17/561* (2013.01)

(58) Field of Classification Search
CPC ..... H04N 5/2251; G03B 17/02; G03B 17/561
See application file for complete search history.

(56) References Cited

U.S. PATENT DOCUMENTS

| | | | | |
|---|---|---|---|---|
| 8,405,766 B2* | 3/2013 | Tatewaki | ............... | G03B 17/02 348/143 |
| 8,558,945 B2* | 10/2013 | Yamauchi | ............... | G03B 15/00 348/373 |
| 2006/0024046 A1* | 2/2006 | Jones | ............... | G08B 13/19619 396/427 |
| 2011/0064403 A1* | 3/2011 | Nakano | ................... | G03B 17/02 396/535 |
| 2012/0062789 A1* | 3/2012 | Sasaki | .................... | G03B 17/00 348/373 |

FOREIGN PATENT DOCUMENTS

JP    2003-174572 A    6/2003

* cited by examiner

*Primary Examiner* — Twyler Haskins
*Assistant Examiner* — Angel L Garces-Rivera
(74) *Attorney, Agent, or Firm* — Canon U.S.A., Inc. IP Division

(57) ABSTRACT

An inner cover supported to be rotatable in a panning direction is urged by an elastic member in a direction approaching a dome. When a shock is applied to a dome cover, the inner cover is pressed in a direction away from the dome and touches a supporting member of a fixing portion. As a result deformation of the dome can be suppressed, and a lens unit and a panning rotation unit can be protected. In addition, since the dome cover is suppressed, it is not required to provide a retraction mechanism in the lens unit. Moreover, since no rigidity of the dome cover is required, the dome cover can be reduced in wall thickness and increased in diameter, so that priority is given to optical performance of the lens unit.

4 Claims, 6 Drawing Sheets

BEFORE APPLICATION OF SHOCK

AFTER APPLICATION OF SHOCK

IMAGE PICKUP APPARATUS WITH SHOCK RESISTANCE

BACKGROUND OF THE INVENTION

Field of the Invention

The present invention relates to an image pickup apparatus such as a monitoring camera with shock resistance.

Description of the Related Art

In some conventional monitoring cameras with shock resistance property, a dome cover for covering a lens unit is made of a material such as shock-resistant polycarbonate resin, and an exterior housing for covering a main body of the camera is made of metal to achieve the shock resistance property. However, as compared with the exterior housing made of metal, the dome cover made of resin may be momentarily deformed to a great extent by a shock, even if the dome cover is not damaged. For this reason, if a shock over a certain energy level is applied to the monitoring camera, the dome cover is deformed by the shock, and the deformed dome cover may contact an inner structure such as the lens unit, resulting in a damage of the inner structure.

As an example of a conventional technique to solve such an issue, a monitoring camera is discussed in which a rotation base serving as a supporting member supporting a camera unit is fixed with shaft screws, which are each inserted into a vertically extending elongate hole provided in a support of a rotary bracket. In this example, the rotation base can be supported to be rotatable in the vertical direction and linearly movable in the vertical direction with a simple structure, thereby absorbing a shock when a cover is hit, so that damage to the camera unit can be prevented (see Japanese Patent Application Laid-Open No. 2003-174572).

The conventional monitoring camera with shock resistance property has a structure in which the lens unit is retracted when the dorm cover is deformed by a shock applied to the dome cover, and thus preventing a damage. A deformation amount of the dome cover in receiving a shock depends on the wall thickness and the diameter of a hemispherical shape of the dome cover. The smaller the wall thickness, the greater the deformation amount. The larger the diameter of the hemispherical shape, the greater the deformation amount of the dome cover.

Further, as the wall thickness is greater, or as the diameter of the hemispherical shape is smaller, an influence exerted by the dome cover on optical performance of the lens unit is greater because the dome cover acts as an optical component. When a lens unit with high-magnification and high-telephoto zoom capabilities is employed, the influence on the optical performance is even greater, which may cause degradation in resolution. Therefore, a monitoring camera equipped with the high-magnification and high-telephoto lens unit is desirably configured in such a manner that the wall of the dome cover is as thin as possible, and that the diameter of the hemispherical shape is large.

However, in the conventional monitoring camera with shock resistance property, if the dome cover has a thinner wall and a larger diameter, the deformation amount of the dome cover due to a shock increases. This increases the amount of retraction necessary for the lens unit, which leads to an increase of the size of the monitoring camera.

SUMMARY OF THE INVENTION

According to an aspect of the present invention, an image pickup apparatus includes a lens unit including an optical system and an image pickup device, a dome cover covering the lens unit, a rotation base unit configured to support the lens unit, a fixing portion configured to support the rotation base unit while allowing the rotation base unit to rotate in a pan direction, and an inner cover disposed between the lens unit and the dome cover. The inner cover is elastically supported by the rotation base unit, and in a case where the inner cover is pressed, the inner cover moves in a direction away from the dome cover and contacts the fixing portion.

With such a configuration, when a shock is applied to the dome cover, the inner cover, not the lens unit, contacts the deformed dome cover first. In a state where no external force such as a shock is being applied to the inner cover, the inner cover is separated from the fixing portion by an elastic member. However, in a state where a shock is being applied, the inner cover is pressed by the deformed dome cover, so that the inner cover moves and then contacts the fixing portion. Because of the rigidity of the inner cover interposed between the fixing portion and the dome cover, deformation of the dome cover is suppressed, so that collision with the lens unit can be prevented.

Further, in the image pickup apparatus according to the aspect of the present invention, the lens unit is supported by the rotation base unit so as to be rotatable in a tilt direction, the inner cover has a hemispherical shape similar to the dome cover, and an elongate hole shape portion provided to avoid shielding a light beam area within a range in which the lens unit rotates in the tilt direction.

With such a configuration, in the image pickup apparatus in which the lens unit is rotatable in the tilt direction, the inner cover can be disposed between the dome cover and the lens unit without affecting an image pickup range.

Furthermore, in the image pickup apparatus according to the aspect of the present invention, the inner cover includes resin, and has hollow shape portions facing each other on both sides across the center line of the elongate hole shape in a longitudinal direction, and further has a plurality of reinforcing ribs intersecting with the hollow shape portion in a direction perpendicular to the longitudinal direction.

With such a configuration, the weight of the inner cover can be reduced without forming the inner cover by using rigid metal or increasing the thickness of resin. Therefore, a load when panning the image pickup apparatus can be reduced.

As described above, according to the aspect of the present invention, when a shock is applied to the dome cover, the shock is partially received by the inner cover with its rigidity, so that the deformation of the dome cover can be suppressed. Therefore, the deformed dome cover can avoid colliding with the lens unit, thereby causing no damage. In addition, since the deformation of the dome cover is suppressed in the above-described configuration, it is not required to provide a retraction mechanism in the lens unit. Moreover, since the rigidity of the dome cover is not required in the above-described configuration, the dome cover can be reduced in wall thickness and increased in diameter, so that priority can be given to optical performance of the lens unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

DETAILED DESCRIPTION OF PREFERRED EMBODIMENTS

Exemplary embodiments, features and aspects of the present invention will now be described in detail below with reference to the attached drawings.

An exemplary embodiment of the present invention will be described below, by using a monitoring camera as an example.

Figure 1:
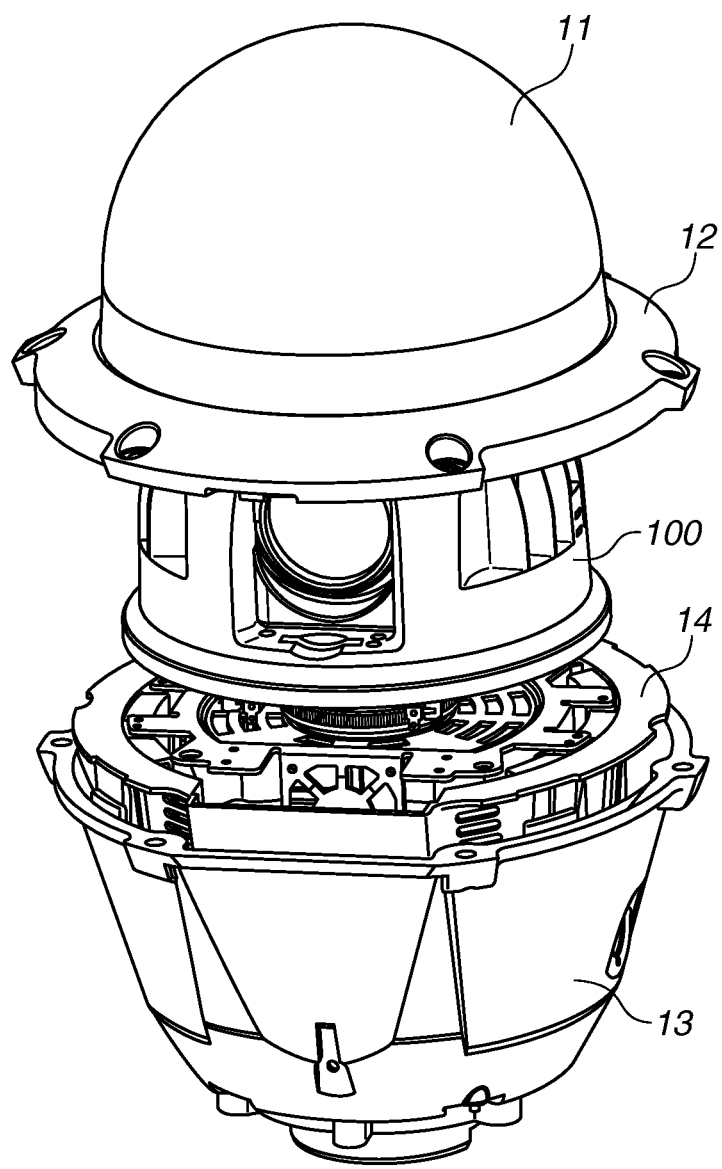
FIG. 1 is a configuration diagram illustrating an entire image pickup apparatus according to an exemplary embodiment of the present invention.

FIG. 1 is a configuration diagram illustrating an entire image pickup apparatus according to the exemplary embodiment of the present invention. A dome component 11 is attached to a cover 12, so that the dome component 11 and the cover 12 are integrated in to a single unit serving as a dome cover. The cover 12 is attached to a case 13, and covers an image pickup apparatus 100. Further, an inner case 14 is attached to the inside of the case 13.

Figure 2:
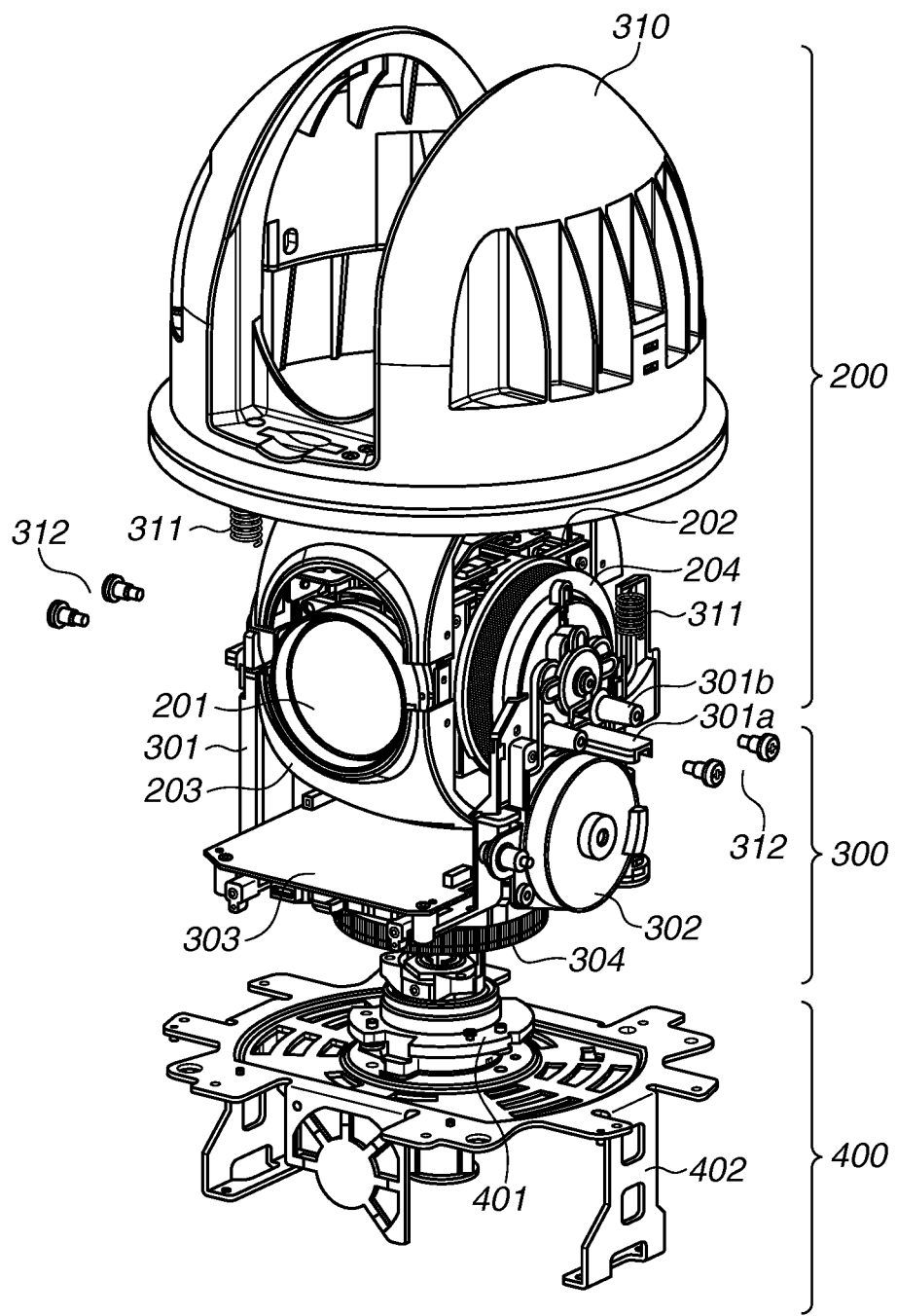
FIG. 2 is a configuration diagram illustrating the inside of the image pickup apparatus according to the exemplary embodiment of the present invention.

FIG. 2 is a configuration diagram illustrating the inside of the image pickup apparatus 100 according to the exemplary embodiment of the present invention. The image pickup apparatus 100 broadly includes a camera unit 200, a rotation base unit 300, and a fixing portion unit 400.

The camera unit 200 is configured as follows. A lens unit 201 has an optical system such as a lens, and further has an image pickup device such as a charge coupled device (CCD) sensor and a complementary metal oxide semiconductor (CMOS) sensor. The lens unit 201 is supported by a lens frame unit 202 having a tilt rotation shaft. A camera cover 203 for covering the lens unit 201 is attached to the lens frame unit 202. Further, a tilt pulley 204, which is provided to drive the camera unit 200 so that the camera unit 200 rotates in a tilt direction, is fixed to the lens frame unit 202.

The rotation base unit 300 is configured as follows. A rotation base 301 supports the camera unit 200, while allowing the camera unit 200 to rotate in the tilt direction. A tilt motor 302 drives the tilt pulley 204 by using a timing belt, so that the camera unit 200 can be rotated in the tilt direction. A control board 303 is fixed to the rotation base 301. Further, a pan motor (not illustrated) is attached to the rotation base 301. The pan motor rotationally drives the camera unit 200 in a pan direction.

An inner cover 310 is elastically supported by the rotation base 301 so as to cover the camera unit 200. The rotation base 301 includes spring receiving portions 301a and stepped screw fixing bosses 301b. The spring receiving portions 301a is disposed facing each other across the camera unit 200 located at the midpoint therebetween. Each of the stepped screw fixing bosses 301b is disposed likewise. The inner cover 310 is urged by springs 311 in a direction approaching the dome component 11. The inner cover 310 is supported to be movable in a direction away from the dome component 11 by inserting and fixing the stepped screws 312 into aperture portions 310b illustrated in FIG. 3. Further, the inner cover 310 has a substantially hemispherical shape similar to the shape of the dome component 11. The inner cover 310 is elastically supported by the rotation base 301 so as to be disposed in a space between the camera unit 200 and the dome component 11.

Figure 3:
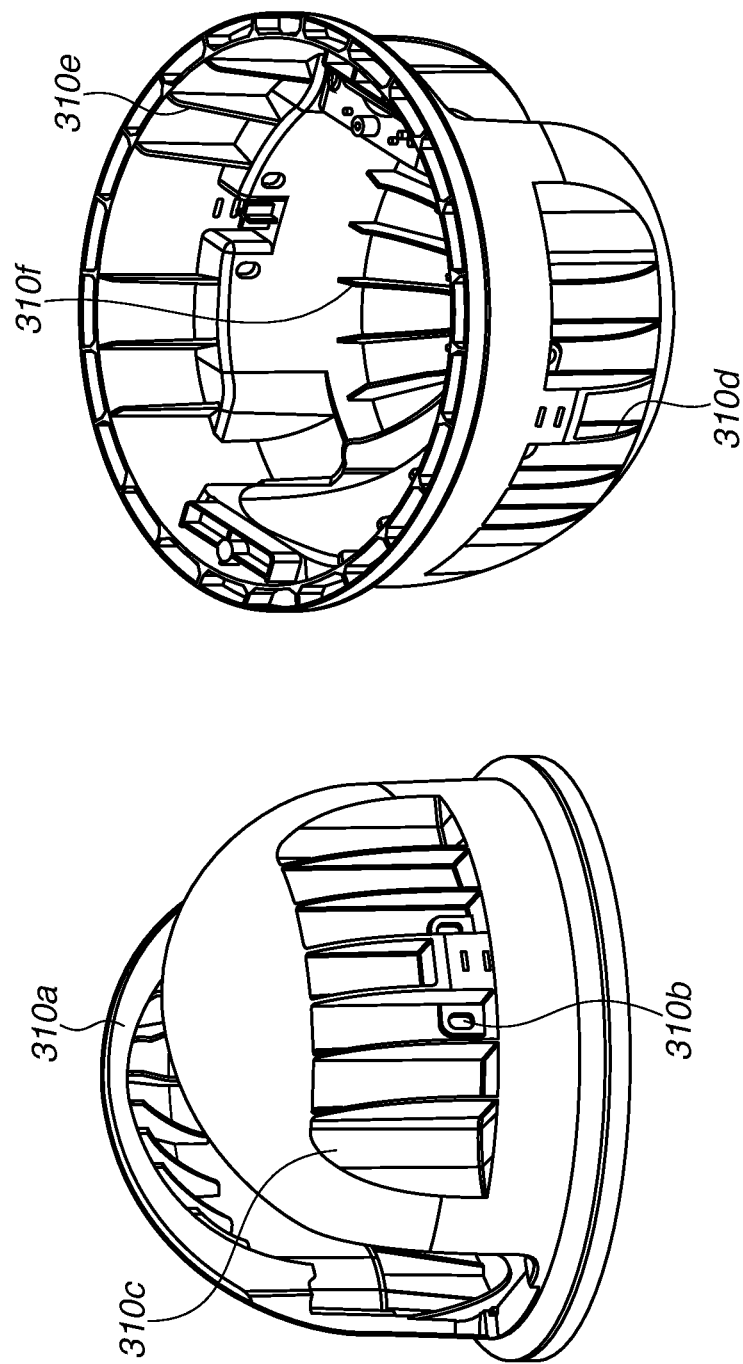
FIG. 3 is a diagram illustrating a detailed shape of an inner cover according to the exemplary embodiment of the present invention.

FIG. 3 is a diagram illustrating a detailed shape of the inner cover 310 according to the present exemplary embodiment. In a range in which the camera unit 200 rotates in the tilt direction, the inner cover 310 has an elongate hole shape portion 310a provided to avoid shielding a light beam area where the lens unit 201 can capture an image. However, because of the elongate hole shape 310, the inner cover 310 has lower strength than that of the dome component 11 if the inner cover 310 is made of the same material and has the same wall thickness as those of the dome component 11.

In a case where the inner cover 310 is made of a metallic material to increase the strength, the weight and the rotational inertia of the inner cover 310 increase, resulting in a large load in rotating the rotation base 301 in the pan direction. Therefore, the rotation base 301 cannot be driven to rotate with high speed and acceleration, or large driving power is necessary. In a case where the inner cover 310 is made of a resin material and the wall thickness of the inner cover 310 is increased to enhance the strength, a similar problem arises in this case as well.

To improve the strength of the inner cover 310, it is effective to provide a tall reinforcing rib in a direction perpendicular to a longitudinal direction of the elongate hole shape portion 310a. However, the sidewall depth of the inner cover 301 is deep because of its substantially hemispherical shape, so that a thin rib would be formed considering a draft angle at the time of molding. Therefore, the inner cover 310 according to the present exemplary embodiment has hollow shape portions 310c. The hollow shape portions 310c are faces each other on both sides across the center line of the elongate hole shape portion 310a in the longitudinal direction. Reinforcing ribs are provided, namely reinforcing ribs 310d provided on the convex side of the hemispherical shape, and reinforcing ribs 310e and 310f provided separately on the concave side of the hemispherical shape. Each of the reinforcing ribs has a shape connecting to or intersecting with the hollow shape portions 310c.

With such a configuration, the sidewall depth can decreases, and reinforcing ribs substantially maintaining the wall thickness can be provided. Therefore, even if the inner cover 310 is made of a resin material, the strength can be increased. Further, the inner cover 310 can be provided as a shock-resistant component superior to the dome component 11 in terms of strength, by employing high-rigidity resin containing fiberglass or carbon filler for the resin material.

The fixing portion unit 400 is configured as follows. A panning bearing unit 401 supports the rotation base unit 300, so that the rotation base unit 300 can rotate in the pan direction. Further, a panning pulley 304 is fixed to the panning bearing unit 401. When the panning pulley 304 is driven by the pan motor using a timing belt, the rotation base unit 300 can rotate in the pan direction. A fixed metal plate 402 supports the panning bearing unit 401, and is fixed to the case 13.

Figure 4:
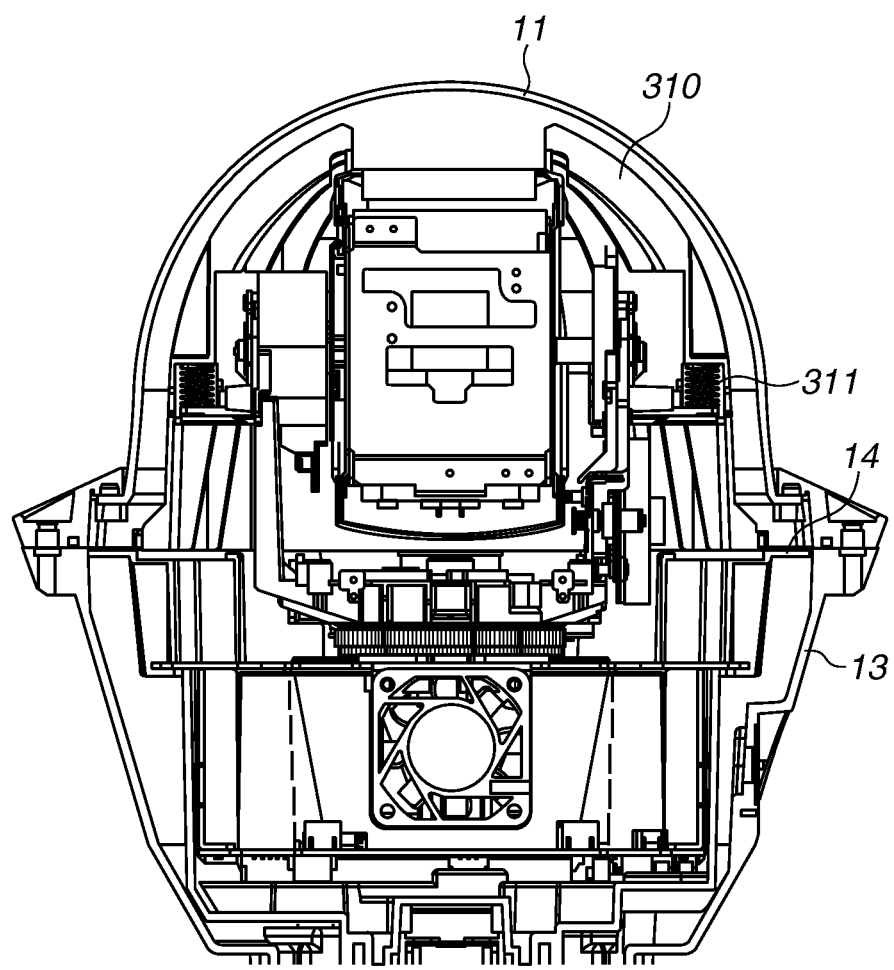
FIG. 4 is a cross-sectional view illustrating the image pickup apparatus before a shock is applied according to the exemplary embodiment of the present invention.
Figure 5:
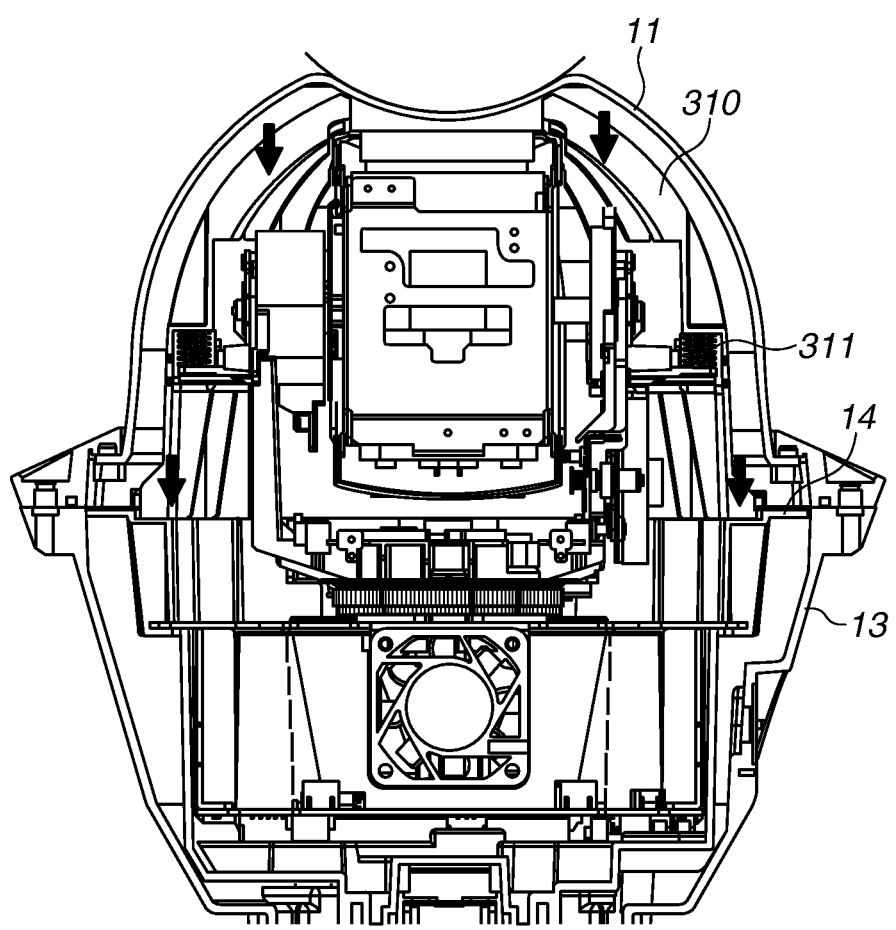
FIG. 5 is a cross-sectional view illustrating the image pickup apparatus after a shock is applied according to the exemplary embodiment of the present invention.
Figure 6:
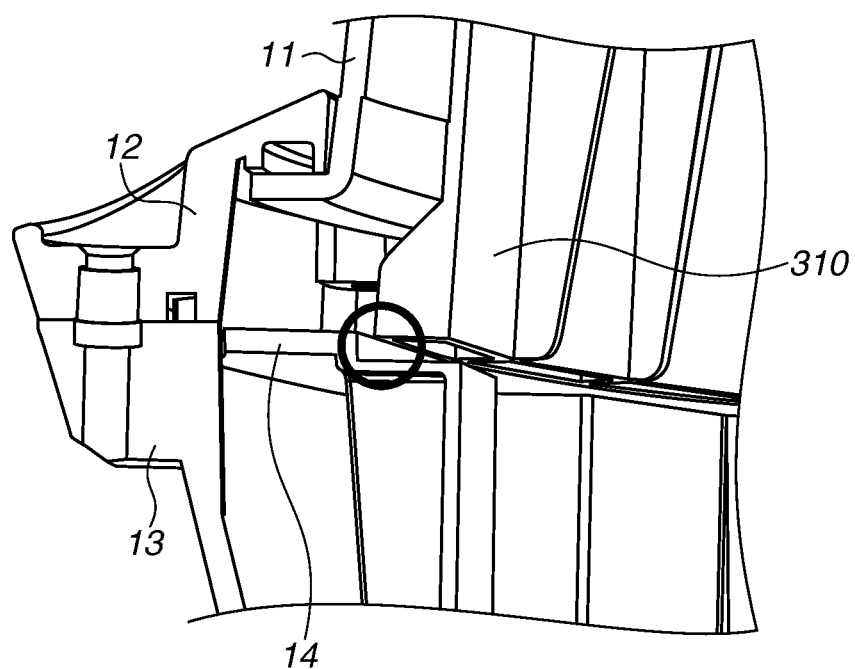
FIG. 6 is a detailed cross-sectional view illustrating the image pickup apparatus before the a shock is applied according to the exemplary embodiment of the present invention.

FIGS. 4 and 6 are cross-sectional views illustrating the image pickup apparatus before a shock is applied to the image pickup apparatus, and FIG. 5 is a cross-sectional view illustrating the image pickup apparatus after the shock is applied to the image pickup apparatus. FIG. 6 illustrates an expanded view of a part where the inner cover 310 is to contact the inner case 14. Before a shock is applied to the image pickup apparatus, the inner cover 310 maintains a predetermined gap relative to the inner case 14 disposed in the fixing portion unit 400, and the inner cover 310 is held in the space between the dome component 11 and the camera unit 200. By maintaining the predetermined gap relative to the inner case 14, the inner cover 310 does not generate a friction, which leads to a load in a movement in the pan direction.

After the shock has been applied to the image pickup apparatus, the inner cover 310 is pressed by the deformed dome component 11, moves in the direction away from the dome component 11, and contacts the inner case 14. The inner cover 310 interposed between the dome component 11 and the inner case 14 has sufficient strength against the shock, and thus is substantially free from deforming. As a result, the deformation of the dome component 11 can be also suppressed. In addition, after ending the influence of the shock, the inner cover 310 returns to the position before the application of the shock, with elasticity of the springs 311.

In addition, a configuration may be applicable in which the reinforcing rib 310e, which forms a part of the inner cover 310, can contact the inner case 14 when the inner case 14 receives the shock.

It is also conceivable to provide such a configuration that the inner cover 310 is immovably fixed relative to the rotation base unit 300, and the rotation base unit 300 receives a shock. In this case, the panning bearing unit 401 and the fixed metal plate 402 receive the shock. Therefore, there is such a concern that a bearing (not illustrated) in the panning bearing unit 401 may be damaged, and that the fixed metal plate 402 may be deformed.

The case 13 is made of a material having sufficient strength, such as metal. The inner case 14 is firmly fixed to the case 13, and thus is almost unlikely to be deformed by the shock applied to the inner cover 310. Further, in the present exemplary embodiment, the inner cover 310 is configured to be able to contact the inner case 14. However, the inner cover 310 may be configured to be able to contact the case 13.

The present invention has been described above in detail based on the exemplary embodiment. However, the present invention is not limited to such a specific exemplary embodiment, and includes various modifications in a scope not deviating from the gist of the present invention. Parts of the above-described exemplary embodiment may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-219765, filed Oct. 28, 2014, which is hereby incorporated by reference herein in its entirety.

What is claimed is:

1. An image pickup apparatus comprising:
   a lens unit including an optical system and an image pickup device;
   a dome cover covering the lens unit;
   an inner cover disposed between the lens unit and the dome cover;
   a rotation base unit configured to support the lens unit and the inner cover;
   a fixing portion configured to support the rotation base unit while allowing the rotation base unit to rotate in a pan direction,
   wherein the rotation base unit supports the lens unit not to move to a fixing portion side,
   wherein the rotation base unit supports the inner cover to move to the fixing portion side, and
   wherein, in a case where the inner cover is pressed, the inner cover moves to the fixing portion side and contacts the fixing portion.

2. The image pickup apparatus according to claim 1,
   wherein the lens unit is supported by the rotation base unit so as to be rotatable in a tilt direction, and
   wherein the inner cover has a hemispherical shape similar to the dome cover and an elongate hole shape portion provided to avoid shielding a light beam area within a range in which the lens unit rotates in the tilt direction.

3. The image pickup apparatus according to claim 2,
   wherein the inner cover includes resin, and
   wherein the inner cover has hollow shape portions facing each other on both sides across the center line of the elongate hole shape in a longitudinal direction, and further has a plurality of reinforcing ribs intersecting with the hollow shape portion in a direction perpendicular to the longitudinal direction.

4. The image pickup apparatus according to claim 1, wherein the inner cover has a plurality of reinforcing ribs to protrude from an inner surface of the inner cover.

* * * * *